United States Patent
Lord et al.

(10) Patent No.: US 11,116,254 B2
(45) Date of Patent: Sep. 14, 2021

(54) POWER REGULATION SYSTEM AND METHOD OF SUPPLYING POWER TO AN ELECTRONIC VAPOR PROVISION SYSTEM

(71) Applicant: NICOVENTURES HOLDINGS LIMITED, London (GB)

(72) Inventors: Christopher Lord, London (GB); Martin Mullin, London (FR)

(73) Assignee: Nicoventures Trading Limited, London (GB)

( * ) Notice: Subject to any disclaimer, the term of this patent is extended or adjusted under 35 U.S.C. 154(b) by 101 days.

(21) Appl. No.: 16/188,862

(22) Filed: Nov. 13, 2018

(65) Prior Publication Data

US 2019/0133192 A1    May 9, 2019

Related U.S. Application Data

(62) Division of application No. 15/027,344, filed as application No. PCT/GB2014/053027 on Oct. 8, 2014, now Pat. No. 10,159,279.

(30) Foreign Application Priority Data

Oct. 9, 2013 (GB) .................................... 1317851

(51) Int. Cl.
*A24F 13/00* (2006.01)
*A24F 17/00* (2006.01)
(Continued)

(52) U.S. Cl.
CPC ............. *A24F 40/50* (2020.01); *G06F 1/3296* (2013.01); *H05B 1/0202* (2013.01); *H05B 3/0014* (2013.01); *A24F 40/10* (2020.01)

(58) Field of Classification Search
CPC ........ A24F 47/008; A24F 40/50; A24F 40/51; A24F 40/53
(Continued)

(56) References Cited

U.S. PATENT DOCUMENTS

| | | | |
|---|---|---|---|
| 2,057,353 A | 10/1936 | Whittemore, Jr. | |
| 4,947,875 A | 8/1990 | Brooks et al. | |

(Continued)

FOREIGN PATENT DOCUMENTS

| | | |
|---|---|---|
| CA | 2641869 A1 | 5/2010 |
| CA | 2876267 A1 | 6/2015 |

(Continued)

OTHER PUBLICATIONS

Great Britain Search Report, Application No. GB1511566.3, dated Nov. 30, 2015, 4 pages.
(Continued)

*Primary Examiner* — Abdullah A Riyami
*Assistant Examiner* — Thang H Nguyen
(74) *Attorney, Agent, or Firm* — Patterson Thuente Pedersen, P.A.

(57) ABSTRACT

An electronic vapor provision system is provided including a pressure drop or air flow sensor for monitoring inhalation by a user through the electronic vapor provision system; and a control unit for detecting the start and end of inhalation based on readings from the sensor. The control unit is configured to monitor the cumulative period of inhalation (Ti) over a predetermined window (Tw); and transfer the electronic vapor provision system to a sleep mode if the cumulative period (Ti) exceeds a predetermined threshold (Th).

14 Claims, 7 Drawing Sheets

(51) Int. Cl.
  *A24F 25/00* (2006.01)
  *A24F 40/50* (2020.01)
  *G06F 1/3296* (2019.01)
  *H05B 1/02* (2006.01)
  *H05B 3/00* (2006.01)
  *A24F 40/10* (2020.01)

(58) Field of Classification Search
  USPC .................................................. 131/329
  See application file for complete search history.

(56) References Cited

U.S. PATENT DOCUMENTS

| | | | |
|---|---|---|---|
| 5,095,921 A | 3/1992 | Losee et al. | |
| 5,372,148 A | 12/1994 | McCafferty et al. | |
| 5,809,997 A | 9/1998 | Wolf | |
| 5,894,841 A | 4/1999 | Voges | |
| 5,949,632 A | 9/1999 | Barreras | |
| 6,183,425 B1 | 2/2001 | Whalen | |
| 6,196,218 B1 | 3/2001 | Voges | |
| 6,873,322 B2* | 3/2005 | Hartular | H02J 7/0063 345/212 |
| 6,958,691 B1 | 10/2005 | Anderson et al. | |
| 7,726,320 B2 | 6/2010 | Robinson | |
| 7,726,329 B2 | 6/2010 | Robinson | |
| 8,159,204 B2* | 4/2012 | Grant | H05B 45/375 323/285 |
| 8,550,069 B2 | 10/2013 | Alelov | |
| 8,807,131 B1 | 8/2014 | Tunnell | |
| 8,997,753 B2 | 4/2015 | Li | |
| 9,095,175 B2 | 8/2015 | Terry et al. | |
| 9,289,014 B2 | 3/2016 | Tucker | |
| 9,362,048 B2* | 6/2016 | Yamamoto | B60L 3/04 |
| 9,451,791 B2 | 9/2016 | Sears | |
| 9,497,999 B2 | 11/2016 | Lord | |
| 9,597,466 B2 | 3/2017 | Henry | |
| 2003/0033055 A1 | 2/2003 | McRae et al. | |
| 2003/0123328 A1 | 7/2003 | Guantr | |
| 2003/0179003 A1 | 9/2003 | Toda et al. | |
| 2003/0226837 A1 | 12/2003 | Blake | |
| 2005/0045193 A1 | 3/2005 | Yang | |
| 2005/0058441 A1 | 3/2005 | Kameyama et al. | |
| 2005/0081846 A1 | 4/2005 | Barney | |
| 2005/0143866 A1 | 6/2005 | McRae | |
| 2005/0161467 A1 | 7/2005 | Jones | |
| 2005/0247305 A1 | 11/2005 | Zierenberg | |
| 2005/0268911 A1 | 12/2005 | Cross et al. | |
| 2006/0047368 A1 | 3/2006 | Maharajh | |
| 2006/0130838 A1 | 6/2006 | Yong | |
| 2006/0130860 A1 | 6/2006 | Cholet | |
| 2007/0006889 A1 | 1/2007 | Kobal | |
| 2007/0045288 A1 | 3/2007 | Nelson | |
| 2008/0092912 A1 | 4/2008 | Robinson et al. | |
| 2008/0257367 A1 | 10/2008 | Paterno | |
| 2009/0230117 A1 | 9/2009 | Fernando et al. | |
| 2009/0283103 A1 | 11/2009 | Nielsen | |
| 2009/0308387 A1 | 12/2009 | Andersen | |
| 2010/0050770 A1 | 3/2010 | Barger | |
| 2010/0059070 A1 | 3/2010 | Potter et al. | |
| 2010/0206306 A1 | 8/2010 | Feriani | |
| 2010/0242974 A1 | 9/2010 | Pan | |
| 2011/0036346 A1 | 2/2011 | Cohen | |
| 2011/0113368 A1 | 5/2011 | Carvajal | |
| 2011/0210746 A1 | 9/2011 | Yogou et al. | |
| 2011/0226236 A1 | 9/2011 | Buchberger | |
| 2011/0247620 A1 | 10/2011 | Armstrong | |
| 2011/0253139 A1 | 10/2011 | Guthrie | |
| 2011/0265806 A1* | 11/2011 | Alarcon | B05B 1/30 131/273 |
| 2011/0304282 A1 | 12/2011 | Li et al. | |
| 2012/0012106 A1 | 1/2012 | Bari | |
| 2012/0048266 A1 | 3/2012 | Alelov | |
| 2012/0060853 A1 | 3/2012 | Robinson | |
| 2012/0318882 A1 | 12/2012 | Abehasera | |
| 2013/0008436 A1 | 1/2013 | Von Hollen | |
| 2013/0042865 A1 | 2/2013 | Monsees | |
| 2013/0104916 A1* | 5/2013 | Bellinger | A61M 15/06 131/328 |
| 2013/0228191 A1 | 9/2013 | Newton | |
| 2013/0255702 A1 | 10/2013 | Griffith | |
| 2013/0269685 A1 | 10/2013 | Wachtel | |
| 2013/0284192 A1 | 10/2013 | Peleg | |
| 2013/0340775 A1 | 12/2013 | Juster | |
| 2014/0000603 A1 | 1/2014 | Hosemann | |
| 2014/0000638 A1 | 1/2014 | Sebastian | |
| 2014/0008384 A1 | 1/2014 | Helmlinger | |
| 2014/0014126 A1* | 1/2014 | Peleg | A24F 40/57 131/329 |
| 2014/0060554 A1 | 3/2014 | Collett | |
| 2014/0096781 A1 | 4/2014 | Sears | |
| 2014/0123990 A1 | 5/2014 | Timmermans | |
| 2014/0209105 A1 | 7/2014 | Sears | |
| 2014/0261486 A1 | 9/2014 | Potter | |
| 2014/0270727 A1 | 9/2014 | Ampolini | |
| 2014/0345635 A1 | 11/2014 | Rabinowitz | |
| 2014/0366894 A1* | 12/2014 | Liu | A24F 40/60 131/328 |
| 2014/0366898 A1 | 12/2014 | Monsees | |
| 2015/0097513 A1 | 4/2015 | Liberi | |
| 2015/0114408 A1 | 4/2015 | Lord | |
| 2015/0128965 A1 | 5/2015 | Lord | |
| 2015/0128966 A1 | 5/2015 | Lord | |
| 2015/0136153 A1 | 5/2015 | Lord | |
| 2015/0237917 A1 | 8/2015 | Lord | |
| 2015/0245660 A1 | 9/2015 | Lord | |
| 2015/0257448 A1 | 9/2015 | Lord | |
| 2015/0336689 A1 | 11/2015 | Brown et al. | |
| 2016/0206000 A1 | 7/2016 | Lord et al. | |
| 2016/0218656 A1* | 7/2016 | Hawliczek | H01M 16/006 |
| 2016/0242466 A1 | 8/2016 | Lord et al. | |
| 2016/0339188 A1* | 11/2016 | Flickinger | A61M 15/08 |
| 2018/0153223 A1 | 6/2018 | Lord | |

FOREIGN PATENT DOCUMENTS

| | | |
|---|---|---|
| CN | 1280661 A | 1/2001 |
| CN | 1330563 A | 1/2002 |
| CN | 201029436 Y | 3/2008 |
| CN | 201029436 Y | 3/2008 |
| CN | 201238610 Y | 5/2009 |
| CN | 101518361 A | 9/2009 |
| CN | 101557728 A | 10/2009 |
| CN | 100566769 C | 12/2009 |
| CN | 201379072 Y | 1/2010 |
| CN | 201393548 Y | 2/2010 |
| CN | 201821914 U | 5/2011 |
| CN | 201830899 U | 5/2011 |
| CN | 102247640 A | 11/2011 |
| CN | 102934843 A | 2/2013 |
| CN | 202890466 U | 4/2013 |
| CN | 203070141 U | 7/2013 |
| CN | 103237468 A | 8/2013 |
| CN | 203841114 U | 9/2014 |
| CN | 203986103 U | 12/2014 |
| CN | 204335831 U | 5/2015 |
| DE | 102009029768 | 1/2011 |
| EP | 1712178 A2 | 10/2006 |
| EP | 2143346 | 1/2010 |
| EP | 2404515 A1 | 1/2012 |
| EP | 2460423 A1 | 6/2012 |
| ES | 1091555 U | 10/2013 |
| GB | 2468932 A | 9/2010 |
| GB | 2502053 A | 11/2013 |
| GB | 2502055 A | 11/2013 |
| GB | 2502162 A | 11/2013 |
| GB | 2502163 A | 11/2013 |
| GB | 2502164 A | 11/2013 |
| GB | 2514767 A | 12/2014 |
| JP | H05-212100 | 8/1993 |
| JP | 3392138 | 1/2003 |
| JP | 2006-018057 | 1/2006 |
| JP | 2006-338178 | 12/2006 |
| JP | 3159830 U | 6/2010 |
| KR | 20110002227 U | 3/2011 |

(56) References Cited

FOREIGN PATENT DOCUMENTS

| | | | |
|---|---|---|---|
| KR | 1020110132290 | | 12/2011 |
| KR | 20120093046 | A | 8/2012 |
| RU | 72821 | U1 | 5/2008 |
| RU | 2336001 | C2 | 10/2008 |
| RU | 2336002 | C2 | 10/2008 |
| RU | 94815 | U1 | 6/2010 |
| RU | 2425608 | | 8/2011 |
| RU | 110608 | U1 | 11/2011 |
| RU | 124120 | | 1/2013 |
| SE | 9900703 | L | 12/1999 |
| TW | 200928407 | A | 7/2009 |
| UA | 92474 | | 11/2010 |
| UA | 67598 | | 2/2012 |
| UA | 100734 | | 1/2013 |
| UA | 78167 | | 3/2013 |
| WO | WO9118860 | A1 | 12/1991 |
| WO | WO9418860 | A1 | 9/1994 |
| WO | WO9501137 | A1 | 1/1995 |
| WO | WO98017131 | A1 | 4/1998 |
| WO | WO0064517 | A1 | 11/2000 |
| WO | WO2012/109371 | | 8/2002 |
| WO | WO2013060874 | A2 | 5/2003 |
| WO | WO 2004/080216 | A1 | 9/2004 |
| WO | WO 2004/095955 | A1 | 11/2004 |
| WO | WO2008142015 | | 11/2008 |
| WO | WO2009118085 | A1 | 10/2009 |
| WO | WO2010073122 | | 7/2010 |
| WO | WO2010091593 | A1 | 8/2010 |
| WO | WO2010118644 | A1 | 10/2010 |
| WO | WO2010145805 | A1 | 12/2010 |
| WO | WO2012109371 | | 2/2011 |
| WO | WO2011079932 | | 7/2011 |
| WO | WO2013060781 | | 10/2011 |
| WO | WO 2011137453 | A2 | 11/2011 |
| WO | WO2011147699 | A1 | 12/2011 |
| WO | WO 2012/048266 | | 4/2012 |
| WO | WO2012109371 | A2 | 8/2012 |
| WO | WO2012117376 | | 9/2012 |
| WO | WO2012120487 | | 9/2012 |
| WO | WO2013060784 | A2 | 5/2013 |
| WO | WO 2013/098398 | | 7/2013 |
| WO | WO2013098397 | | 7/2013 |
| WO | WO2013116572 | | 8/2013 |
| WO | WO2013138384 | A2 | 9/2013 |
| WO | WO2013148810 | A1 | 10/2013 |
| WO | WO2014004437 | A1 | 1/2014 |
| WO | WO 2014037794 | A2 | 3/2014 |
| WO | WO2014054035 | A1 | 4/2014 |
| WO | WO2015138589 | | 9/2015 |
| WO | WO2015192084 | | 12/2015 |
| WO | WO2017001817 | | 1/2017 |

OTHER PUBLICATIONS

International Preliminary Report on Patentability, Application No. PCT/GB2016/051729, dated Sep. 20, 2017, 11 pages.
International Search Report and Written Opinion, Application No. PCT/GB2016/051729, dated Aug. 22, 2016, 20 pages.
IPRP for International Patent Application No. PCT/EP2013/071070 dated Nov. 21, 2014.
First Office Action for Chinese Application No. 201380054442.8 dated Aug. 30, 2016.
Notice to File a Response for Korean Application No. 10-2015-7010072 dated Oct. 19, 2016.
Japanese Notice of Allowance for Japanese Application No. 2015-512037 dated Dec. 12, 2015.
Decision to Grant for Russian Application No. 2014150496 dated Feb. 16, 2016.
Load Detecting Power Supply. National Semiconductor RD-166 Product Applications Design Center. Dec. 2008, 17 pages.
Sadaphal et al., "Random and Periodic Sleep Schedules for Target Detection in Sensor Networks," Tata Research Development and Design Centre and Department of Computer Science and Engineering—Indian Institute of Technology, Mar. 17, 2008.
International Preliminary Report on Patentability, for PCT/EP2013/059954, dated Jul. 10, 2014.
Written Opinion, for PCT/EP2013/059954, dated Apr. 16, 2014, 5 pages.
International Search Report, for PCT/EP2013/059954, dated Sep. 25, 2013, 8 pages.
Korean Office Action, Application No. KR 10-2014-7035205, dated Aug. 11, 2016, 6 pages.
Chinese Office Action, Application No. CN 201380025370.4, dated Mar. 21, 2016, 9 pages.
International Search Report, for PCT/EP2013/071070, dated Apr. 2, 2014, 6 pages.
Search Report and Written Opinion, for PCT/GB2014/053027, dated Apr. 22, 2015, 13 pages.
International Preliminary Report on Patentability, for PCT/GB2014/053027, dated Dec. 10, 2015, 19 pages.
Japanese Office Action, Japanese Application No. 2016-520611, dated May 9, 2017, 6 pages (11 pages with translation).
Japanese Search Report, Application No. 2016-520611, dated Mar. 28, 2017, 18 pages (46 pages with translation).
Korean Office Action, Application No. 10-2016-7009422, dated Jul. 26, 2017, 9 pages (17 pages with translation).
Russian Decision to Grant, Application No. 2015114351, dated Aug. 24, 2016, 12 pages.
Chinese Office Action, Application No. 2014800557282, dated Nov. 17, 2017, 12 pages (20 pages with translation).
Application and File History for U.S. Appl. No. 15/027,344, filed Apr. 5, 2016, Inventor: Lord.
Application and File History for U.S. Appl. No. 15/231,359, filed Aug. 8, 2016, Inventor: Christopher Lord.
Korean Office Action, Application No. 10-2018-7014831, dated Dec. 28, 2018, 8 pages (15 pages with translation).
Japanese Office Action, Application No. 2017-153826, dated Jun. 19, 2018, 3 pages (6 pages with translation).
Korean Office Action, Application No. 20157010072, dated Apr. 27, 2018, 10 pages (19 pages with translation).
Russian Search Report, Application No. 2016147728/12, dated Mar. 27, 2018, 3 pages (6 pages with translation).
Australian Third Extended Report, Application No. 2014333571, dated May 23, 2017, 4 pages.
Application and File History for U.S. Appl. No. 14/401,511, filed Nov. 14, 2014, Inventor: Christopher Lord.
Application and File History for U.S. Appl. No. 14/432,752, filed Mar. 31, 2015, Inventor: Christopher Lord.
Australian First Examination Report, Application No. 2013261801, dated Jul. 10, 2015, 2 pages.
Australian First Extended Report, Application No. 2013331849, dated Dec. 1, 2015, 3 pages.
Australian First Extended Report, Application No. 2014333571, dated Nov. 25, 2016, 4 pages.
Australian Second Examination Report, Application No. 2013261801, dated Jun. 23, 2016, 3 pages.
Australian Second Extended Report, Application No. 2013331849, dated May 2, 2016, 3 pages.
Australian Second Extended Report, Application No. 2014333571, dated Jan. 23, 2017, 4 pages.
Canadian Office Action, Application No. 2,872,764, dated Aug. 31, 2016, 6 pages.
Canadian Office Action, Application No. 2,872,764, dated Oct. 5, 2015, 6 pages.
Canadian Office Action, Application No. 2,886,922, dated Mar. 4, 2016, 3 pages.
Canadian Office Action, Application No. 2,922,280, dated Jan. 20, 2017, 4 pages.
Chinese Office Action, Application No. 201380025370.4, dated Oct. 11, 2016, 3 pages (8 pages with translation).
Chinese Office Action, Application No. 201380054442.8, dated Jun. 28, 2017, 8 pages.
Corrected IPRP, International Application No. PCT/EP2013/071070, dated Jun. 19, 2015, 13 pages.

(56) References Cited

OTHER PUBLICATIONS

EP Office Action, Application No. 13779773, dated Aug. 7, 2017, 2 pages.
European Extended Report, Application No. 13779773.4, dated Jun. 20, 2016, 2 pages.
Japanese Decision to Grant, Application No. 2015-537196, dated Jul. 6, 2017, 3 pages (6 pages with translation).
Japanese Office Action, Application No. 2015-537196, dated Mar. 22, 2016, 3 pages (7 pages with translation).
Japanese Office Action, Application No. 2015-537196, dated Nov. 22, 2016, 4 pages (9 pages with translation).
Korean Office Action, Application No. 10-2014-7035201, dated Sep. 23, 2016, 6 pages.
New Zealand Extended Report, Application No. 71778, dated Aug. 15, 2016, 3 pages.
New Zealand First Examination Report, Application No. 717778, dated May 2, 2016, 4 pages.
New Zealand Extended Report, Application No. 717778, dated Nov. 16, 2016, 1 page.
Japanese Office Action, Application No. 2018-033546, dated Feb. 15, 2019, 7 pages.
EP Notice of Opposition (Philip Morris Products), Application No. 14784354.4, dated Feb. 20, 2020, 69 pages.
EP Notice of Opposition (JT International), Application No. 14784354.4, dated Feb. 20, 2020, 43 pages.
Transactions of the Royal Society of Edinburgh, 1848, vol. XVIII, containing the Makerstoun Magnetical and Meteorological Observations for 1844, Robert Grant & Sons, pp. 419-424.
Farsalinos, Konstantinos et al., "Evaluation of Electronic Cigarette Use (Vaping) Topography and Estimation of Liquid Consumption: Implications for Research Protocol Standards Definition and for Public Health Authorities' Regulation" Int J Environ. Res. Public Health, 2013.
Williams, Monique et al., "Variability Among Electronic Cigarettes in the Pressure Drop, Airflow Rate, and Aerosol Production" Nicotine & Tobacco Research Advance Access, Oct. 12, 2011.
Japanese Office Action, Application No. 2018-033546, dated Oct. 29, 2019, 14 pages.
Russian Decision to Grant, Application No. 2018129541, dated Feb. 28, 2019, 14 pages.
Russian Decision to Grant, Application No. 201603517, dated Jun. 17, 2020, 10 pages.
Chinese Office Action, Application No. 201910322955.1, dated Mar. 24, 2021, 16 pages.
Chinese Search Report, Application No. 201910322955.1, dated Mar. 13, 2021, 3 pages.

\* cited by examiner

1

POWER REGULATION SYSTEM AND METHOD OF SUPPLYING POWER TO AN ELECTRONIC VAPOR PROVISION SYSTEM

RELATED APPLICATIONS

This application is a division of application Ser. No. 15/027,344 filed Apr. 5, 2016, which in turn is a National Phase entry of PCT Application No. PCT/GB2014/053,027, filed Oct. 8, 2014, which claims priority from GB Patent Application No. 1317851.2, filed Oct. 9, 2013, said applications being hereby incorporated by reference herein in their entireties.

FIELD

The present disclosure relates to electronic vapor provision systems such as electronic nicotine delivery systems (e.g. e-cigarettes).

BACKGROUND

Electronic vapor provision systems such as e-cigarettes generally contain a reservoir of liquid which is to be vaporized, typically nicotine. When a user inhales on the device, a heater is activated to vaporize a small amount of liquid, which is therefore inhaled by the user.

The use of e-cigarettes in the UK has grown rapidly, and it has been estimated that there are now over a million people using them in the UK.

SUMMARY

The disclosure is defined in the appended claims.

In one aspect, there is provided an electronic vapor provision system including: a pressure drop or air flow sensor for monitoring inhalation by a user through the electronic vapor provision system; and a control unit for detecting the start and end of inhalation based on readings from the sensor; wherein the control unit is configured to: monitor the cumulative period of inhalation over a predetermined window; and transfer the electronic vapor provision system to a sleep mode if the cumulative period exceeds a predetermined threshold.

In one embodiment, the predetermined window represents a rolling window. In other words, the predetermined window represents the last 20, 25, 30, 45 seconds etc. depending on the period of the window.

In one embodiment, upon entering sleep mode, one or more components of the system must be disengaged and re-engaged to transfer the system from the sleep mode to a user mode (in which vapor can be inhaled). In one embodiment, the electronic vapor provision system comprises a vaporizer and a power supply whereby the vaporizer must be disengaged and re-engaged with the power supply in order to re-enter user mode. This disengaging and re-engaging can be considered as a form of resetting the device.

In a further aspect, there is provided an electronic vapor provision system including: a pressure drop or air flow sensor for monitoring inhalation by a user through the electronic provision system; and a control unit for detecting the start and end of inhalation based on readings from the sensor, wherein the control unit is configured to: monitor the period of inhalation; if the period of inhalation exceeds a first threshold: render the electronic vapor provision system inactive for a predetermined period; render the electronic vapor provision system active after the predetermined period has expired; monitor the period of the next inhalation; and if the period of the next inhalation exceeds a second threshold, transfer the electronic vapor provision system to a sleep mode.

In one embodiment, the system comprises a vaporizer for vaporizing liquid for inhalation by a user of the electronic vapor provision system and a power supply comprising a cell or battery for supplying power to the vaporizer. After a transfer to sleep mode, the system may be transferred back to a user mode (in which vapor can be inhaled), such that power is available to the vaporizer, by disengaging and re-engaging the vaporizer from the power supply. This disengaging and re-engaging can be considered as a form of resetting the device.

The first threshold may be substantially the same period as the second threshold. Alternatively, the first threshold may be greater than the second threshold. Alternatively, the first threshold may be less than the second threshold.

The period of the first and/or the second threshold may be 3, 3.5, 4, 4.5 or 5 seconds. The period of the first and/or the second threshold may be from about 3 to 5 seconds, 3.5 to 5 seconds or 4 to 5 seconds. The period of the first and/or the second threshold may be greater than 3 seconds. Other embodiments may use different values for the first and/or second thresholds (which may be the same, or may differ from one another).

In one embodiment, the period of inactivity may be from 3 to 5 seconds. Other embodiments may use different values for the period of inactivity, for example, depending on the desired configuration of the system.

In a further aspect, there is provided an electronic vapor provision system including: a vaporizer for vaporizing liquid for inhalation by a user of the electronic vapor provision system; a power supply comprising a cell or battery for supplying power to the vaporizer; a power regulation system for compensating for variation in the voltage level of the power supplied to the vaporizer by the power supply using pulse-width modulation, thereby providing a more consistent output level of vaporized liquid for inhalation by the user.

In one embodiment, the power regulation system comprises a voltage reference generator, and the voltage level of the power supplied to the vaporizer is determined based on a comparison with the voltage from the voltage reference generator.

In one embodiment, the power regulation system comprises a voltage divider for dividing the voltage from the power supply prior to the comparison with the voltage from the voltage reference generator. The voltage divider may comprise a pair of resistors in series.

In one embodiment, the power regulation system is able to provide an approximately constant power level to the vaporizer.

In a further aspect, there is provided an electronic provision system including: a pressure drop or air flow sensor for monitoring inhalation by a user through the electronic vapor provision system; and a control unit for detecting the start and end of inhalation based on readings from the sensor; wherein the control unit is configured to: detect the start of inhalation when the sensor reading departs by more than a first threshold from a previous reading; and detect the end of inhalation when the sensor reading departs by less than a second threshold from the previous reading; wherein the first threshold is greater than the second threshold.

In one embodiment, the previous reading comprises an ambient value which is updated on a periodic basis. In one embodiment, upon detection of the start of inhalation, the control unit increases the rate at which a sensor reading is obtained. In one embodiment, upon detection of the start of inhalation, the control unit sets one or more timers to track the duration of this particular inhalation.

In one embodiment, the first threshold may be an absolute or relative difference with respect to the previous reading. For example, where the first threshold is an absolute difference with respect to the previous reading, the difference may be greater than 150, 200, 250, 300, 350, 400 or 450 Pascals. Alternatively, the difference may be in a range of from 150 to 450, 200 to 400, 250 to 350 or 300 to 350 Pascals. Where the first threshold is a percentage difference with respect to the previous reading, the percentage drop may be 0.2%, 0.3% or 0.4% compared with the previous reading. Other embodiments may use different values for the absolute and/or relative difference, or may adopt a different strategy for setting the first threshold.

In one embodiment, the second threshold may be an absolute or relative difference with respect to the previous reading. For example, where the second threshold is an absolute difference with respect to the previous reading, the difference may be greater than 80, 100 or 120 Pascals. Alternatively, the difference may be in a range of from 20 to 250, 50 to 200, or 75 to 150 Pascals. Where the second threshold is a percentage difference with respect to the previous reading, the percentage drop may be 0.08%, 0.1% or 0.12% compared with the previous reading. Other embodiments may use different values for the absolute and/or relative difference, or may adopt a different strategy for setting the second threshold.

In a further aspect, there is provided an electronic vapor provision system including: a vaporizer for vaporizing liquid for inhalation by a user of the electronic vapor provision system; a power supply comprising a cell or battery for supplying power to the vaporizer; and a control unit for controlling the supply of power from the power supply to the vaporizer, the control unit having a sleep mode where no power is supplied to the vaporizer and a user mode where power is available for supply to the vaporizer, whereby the control unit reverts from user mode to sleep mode after a predetermined amount of time of inactivity in user mode and/or after the vaporizer has been disengaged from the power supply.

The period of inactivity may be varied depending on the desired configuration of the system. For example, the period of inactivity may be greater than 4, 5, or 6 minutes. Other embodiments may use different values for the period of inactivity, for example, depending on the desired configuration of the system.

Where the system is transferred to sleep mode, it may be transferred back to user mode either by disengaging and re-engaging the vaporizer with the power supply, or by re-engaging the vaporizer with the power supply (if previously disengaged).

These and other aspects are apparent from the present disclosure as read as a whole. Therefore, the disclosure is not to be restricted to specific paragraphs, but extends to combinations of the disclosures presented in the whole document. For example, an electronic vapor provision system may be provided in accordance with the present disclosure which includes any one or more of the various aspects described above (or features therefrom).

DETAILED DESCRIPTION

As described above, the present disclosure relates to an electronic vapor provision system, such as an e-cigarette. Throughout the following description the term "e-cigarette" is used; however, this term may be used interchangeably with electronic vapor provision system.

Figure 1:
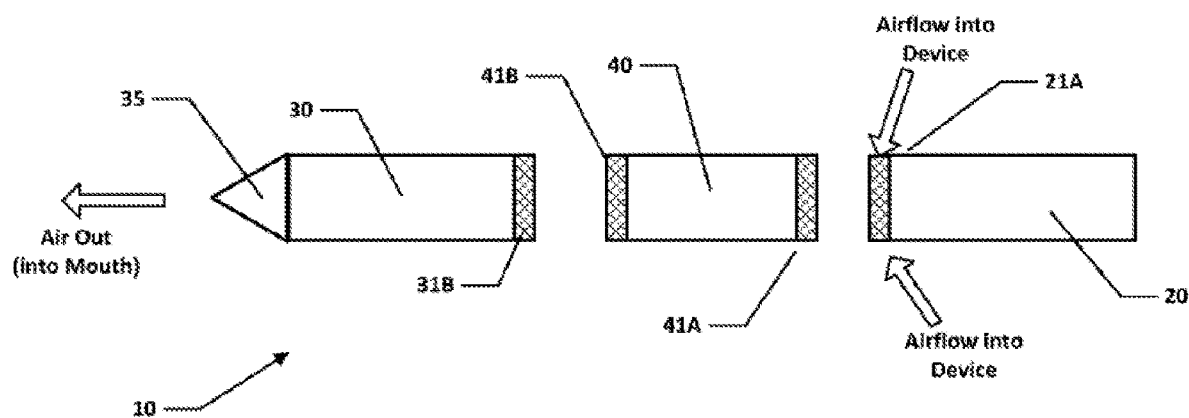
FIG. 1 is a schematic (exploded) diagram of an e-cigarette in accordance with some embodiments of the disclosure.

FIG. 1 is a schematic (exploded) diagram of an e-cigarette 10 in accordance with some embodiments of the disclosure (not to scale). The e-cigarette comprises a body 20, a cartridge 30 and a vaporizer 40. The cartridge includes an internal chamber containing a reservoir of nicotine and a mouthpiece 35. The cartridge reservoir may be a foam matrix or any other structure for retaining the nicotine until such time that it is required to be delivered to the vaporizer. The body 20 includes a re-chargeable cell or battery to provide power to the e-cigarette 10 and a circuit board for generally controlling the e-cigarette. The vaporizer 40 includes a heater for vaporizing the nicotine and further includes a wick or similar device which transports a small amount of nicotine from the reservoir in the cartridge to a heating location on or adjacent the heater. When the heater receives power from the battery, as controlled by the circuit board, the heater vaporizes the nicotine from the wick and this vapor is then inhaled by a user through the mouthpiece.

The body 20 and the vaporizer 40 are detachable from one another, but are joined together when the device 10 is in use, for example, by a screw or bayonet fitting (indicated schematically in FIG. 1 as 41A and 21A). The connection between the body and vaporizer provides for mechanical and electrical connectivity between the two. When the body is detached from the vaporizer, the electrical connection 21A on the body that is used to connect to the vaporizer also serves as a socket for connecting a charging device (not shown). The other end of the charging device can be plugged into a USB socket to re-charge the cell in the body of the e-cigarette. In other implementations, the e-cigarette may be provided with a cable for direction connection between the electrical connection 21A and a USB socket.

The body is provided with one or more holes (not shown in FIG. 1) for air inlet.

These holes connect to an air passage through the body to an air outlet provided as part of connector 21A. This then links to an air path through the vaporizer 40 and the cartridge 30 to the mouthpiece 35. The cartridge 30 and the vaporizer 40 are attached in use by connectors 41B and 31B (again shown schematically in FIG. 1). As explained above, the cartridge includes a chamber containing a reservoir of nicotine, and a mouthpiece. When a user inhales through the mouthpiece 35, air is drawn into the body 20 through one or more air inlet holes. This airflow (or the resulting change in pressure) is detected by a pressure sensor, which in turn activates the heater to vaporize the nicotine from the cartridge. The airflow passes from the body, through the vaporizer, where it combines with the nicotine vapor, and this combination of airflow and nicotine vapor then passes through the cartridge and out of the mouthpiece 35 to be inhaled by a user. The cartridge 30 may be detached from the vaporizer 40 and disposed of when the supply of nicotine is exhausted (and then replaced with another cartridge).

It will be appreciated that the e-cigarette 10 shown in FIG. 1 is presented by way of example, and various other implementations can be adopted. For example, in some embodiments, the cartridge 30 and the vaporizer 40 may be provided as a single unit (generally referred to as a cartomizer), and the charging facility may connect to an additional or alternative power source, such as a car cigarette lighter.

Figure 2:
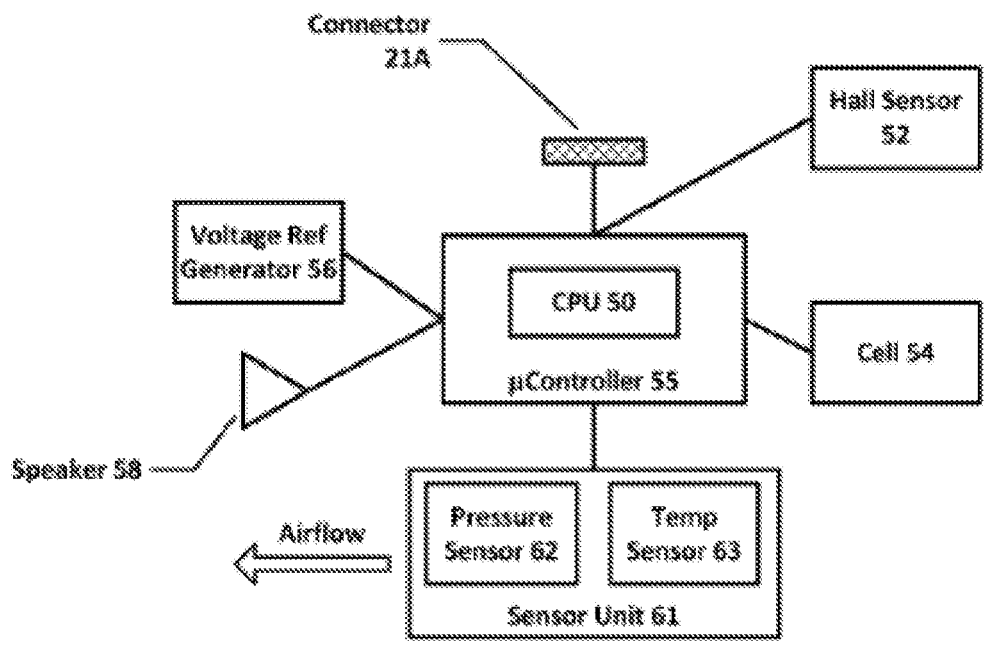
FIG. 2 is a schematic diagram of the main functional components of the body of the e-cigarette of FIG. 1 in accordance with some embodiments of the disclosure.

FIG. 2 is a schematic diagram of the main functional components of the body 20 of the e-cigarette 10 of FIG. 1 in accordance with some embodiments of the disclosure. These components may be mounted on the circuit board provided within the body 20, although depending on the particular configuration, in some embodiments, one or more of the components may instead be accommodated in the body to operate in conjunction with the circuit board, but is/are not physically mounted on the circuit board itself.

The body 20 includes a sensor unit 60 located in or adjacent to the air path through the body 20 from the air inlet to the air outlet (to the vaporizer). The sensor unit includes a pressure sensor 62 and temperature sensor 63 (also in or adjacent to this air path). The body further includes a Hall effect sensor 52, a voltage reference generator 56, a small speaker 58, and an electrical socket or connector 21A for connecting to the vaporizer 40 or to a USB charging device.

The microcontroller 55 includes a CPU 50. The operations of the CPU 50 and other electronic components, such as the pressure sensor 62, are generally controlled at least in part by software programs running on the CPU (or other component). Such software programs may be stored in non-volatile memory, such as ROM, which can be integrated into the microcontroller 55 itself, or provided as a separate component. The CPU may access the ROM to load and execute individual software programs as and when required. The microcontroller 55 also contains appropriate communications interfaces (and control software) for communicating as appropriate with other devices in the body 10, such as the pressure sensor 62.

The CPU controls the speaker 58 to produce audio output to reflect conditions or states within the e-cigarette, such as a low battery warning. Different signals for signaling different states or conditions may be provided by utilizing tones or beeps of different pitch and/or duration, and/or by providing multiple such beeps or tones.

As noted above, the e-cigarette 10 provides an air path from the air inlet through the e-cigarette, past the pressure sensor 62 and the heater (in the vaporizer), to the mouthpiece 35. Thus when a user inhales on the mouthpiece of the e-cigarette, the CPU 50 detects such inhalation based on information from the pressure sensor. In response to such a detection, the CPU supplies power from the battery or cell 54 to the heater, which thereby heats and vaporizes the nicotine from the wick for inhalation by the user.

Figure 3:
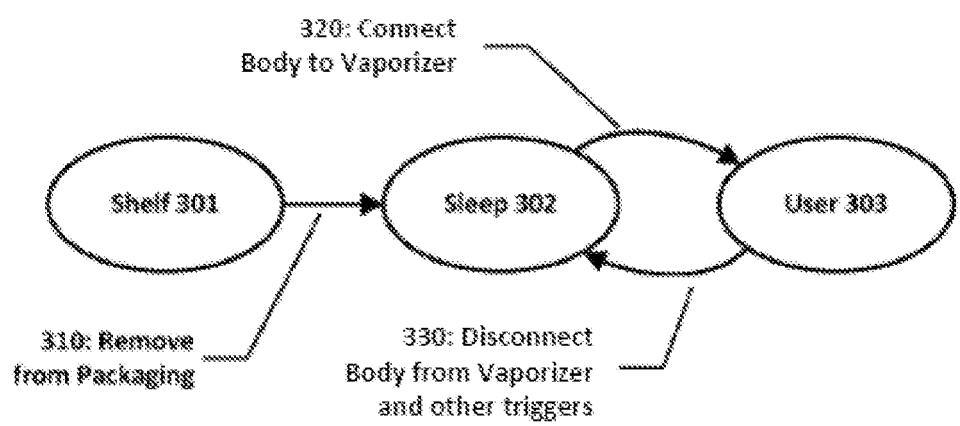
FIG. 3 is a schematic diagram showing various modes or states of the e-cigarette of FIGS. 1 and 2 in accordance with some embodiments of the disclosure.

FIG. 3 is a schematic diagram showing various modes or states of the e-cigarette 10 of FIGS. 1 and 2 in accordance with some embodiments of the disclosure. The device has three modes, namely shelf mode 301, sleep mode 302, and user mode 303. One motivation for the different modes is to help extend cell lifetime—thus shelf mode uses less power from the battery than sleep mode, which in turn uses less power from the cell than user mode. The Hall sensor 52 is responsible for switching from shelf mode to sleep mode, while the CPU 50 is generally responsible for switching the device between sleep mode and user mode (and vice versa) according to predefined triggers. These changes in state may be confirmed by appropriate beeps or tones from the speaker 58.

The device is in shelf mode when in its original packaging (not shown)—hence it remains in shelf mode prior to purchase by a consumer (end user). In shelf mode, the device is largely inactive apart from the Hall effect sensor 52, which draws a very small current (approximately 3 µAmp in some implementations). Since the cell 54 generally has a capacity of over 100 mAmp hours, the device can remain powered in shelf mode for up to four years or more.

The packaging is arranged to have a magnet located close to the Hall sensor. When the device is removed from the packaging, the Hall sensor detects the change (reduction) in magnetic field arising as the device is distanced from the magnet. In one embodiment, the Hall sensor 52 responds to this change by providing power to the microcontroller 55, which then becomes operational. This has the effect of switching the device from shelf mode 301 into sleep mode 302. Note that once the device has switched out of shelf mode, it may be possible for the device to be returned to shelf mode if it is placed back in the packaging containing the magnet, depending upon the particular implementation.

The body further includes a capacitor (not shown in FIG. 2) which is electrically connected to the electrical socket or connector 21A. In the original packaging, the vaporizer 40 is detached from the body 20. In this configuration, with the body 20 not attached to the vaporizer (or the USB charging device), the electrical socket 21A presents an open circuit to the capacitor, which therefore maintains its charge for a relatively substantial period of time. However, if the vaporizer 40 is connected to the electrical socket 21A, this presents a conductive path through which the capacitor is able to discharge very quickly.

When a user wishes to operate the device, the vaporizer is joined to the body. Every two seconds in sleep mode the CPU arranges for the capacitor to be charged up. If the capacitor discharges rapidly (in just a small fraction of a second), the CPU determines that the body is now connected to the vaporizer. This triggers the CPU to switch the device from sleep mode 302 to user mode 303. Alternatively, if the capacitor does not discharge within a predetermined time (much less than two seconds), this indicates that the body is still separated from the vaporizer, and hence the user is not able to operate the device. Accordingly, in this latter case, the CPU maintains the device in sleep mode, and waits for another two second interval before charging up the capacitor again to test for any new connectivity to the vaporizer.

It will be appreciated that the two second interval is a balance between (i) not charging the capacitor too frequently, which would reduce battery lifetime, and (ii) ensuring that if a user does prepare the device for use (by connecting the vaporizer to the body), then the device is active by the time the user inhales to provide the vaporized nicotine. In other implementations, a different interval may be adopted, depending upon the properties and intended usage pattern of the device in question.

There are various routes or triggers for the CPU 50 to switch the device back from user mode 303 to sleep mode 302. One trigger is if the user disengages the vaporizer 40 from the body 20—this would typically indicate that the user has finished using the e-cigarette 10 for the time being. Another trigger is if the user has not inhaled for a predetermined time, such as five minutes (see below for a description of how such inhalation is detected). This helps to ensure that the device is not left in an active state for too long, for example, in a situation in which a user becomes distracted while using the device, and moves away to do something else without separating the body from the vaporizer. If the CPU does transition the device to sleep mode 302 while the vaporizer is still connected to the body, then in order to return to user mode 303, a user must first disengage the vaporizer from the body and then re-engage the vaporizer with the body. (This can be regarded as a form of resetting the device.) Placing the device in sleep mode if it has been inactive for this predetermined period of time also helps to reduce power consumption, as well as to restrict usage of the device by unintended parties.

Further triggers for switching from user mode 303 to sleep mode 302 are provided to help prevent potential abuse of the device. One such trigger monitors the total period of inhalation (say Ti) within a given window (of duration say Tw). If the value of Ti is seen to be unusually large, then the CPU transitions the device to sleep mode. In some implementations, Tw is fixed, for example at 30 second, 40 or 50 seconds. If the total cumulative period of inhalation (Ti) then exceeds a given threshold (Th) (say 10 or 20 seconds) during this window, the sleep mode is triggered. For example, the device might transition to sleep mode if the period of inhalation (Ti) within the last 40 seconds (representing the window, Tw) exceeds the threshold (Th) of 15 seconds.

One way of viewing this trigger is that it monitors an average level of usage (Ti/Tw) by assessing cumulative usage over a period corresponding to multiple inhalations (puffs) of the device, and signals a potential abuse if this average exceeds a given threshold (Th/Tw). It will be appreciated that other implementations may adopt different approaches for determining whether the average or cumulative level of usage represents a potential abuse, and for triggering accordingly.

Figure 4:
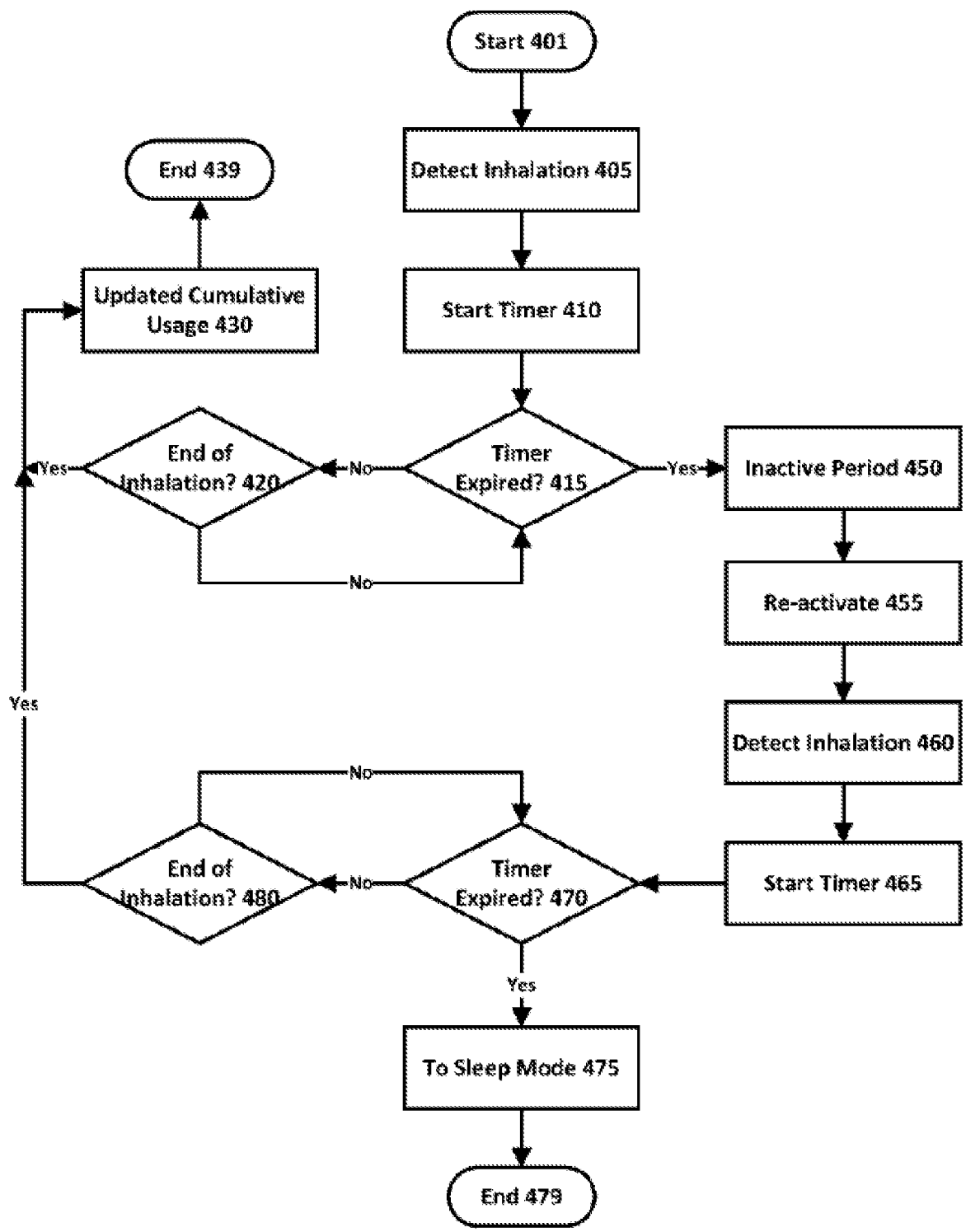
FIG. 4 is a flowchart illustrating a method for helping to protect against potential abuse of the device of FIGS. 1 and 2 in accordance with some embodiments of the disclosure.

Another trigger for helping to protect against potential abuse of the device in some embodiments is illustrated by the flowchart of FIG. 4. The processing, which is generally managed by the CPU 50, commences with detection of the start of inhalation (405), which starts a timer running from zero (410). The CPU now waits for one of two potential inputs: (a) detecting the end of inhalation (420); or (b) the timer reaching a first predefined threshold (410)(say 3, 3.5 or 4 seconds). If the end of the inhalation occurs before the timer reaches the threshold, then processing terminates with no further action (439), apart from updating the cumulative usage information (430). In this case, the processing for the next inhalation will commence again at the start (401) of the flowchart of FIG. 4.

However, if the timer reaches the first predefined threshold before detecting the end of the inhalation, then the CPU automatically shuts off the supply of nicotine vapor by cutting power to the heater. This prevents the user from inhaling further nicotine vapor from the device. The CPU also restarts the timer to wait for a second predefined interval or delay (which may be the same as the first predefined threshold), say 3, 3.5 or 4 seconds. During this time, the CPU maintains the device effectively in an inactive state (450), in that even if the user inhales, this does not trigger the production of nicotine vapor (unlike normal operation of the device). After the time period corresponding to the predefined interval has passed, the CPU in effect re-activates the device (455), so that now normal operation is resumed, in that if the user inhales, this does trigger the CPU to switch on the heater to produce nicotine vapor. However, in response to detecting such a further inhalation (460), the CPU starts the timer again (465), and determines (470) whether the duration of this further inhalation exceeds a second predefined threshold (which may the same as the first predefined threshold), say 3, 3.5 or 4 seconds. This determination is analogous to the situation with the first inhalation, in that the CPU is waiting to see which occurs first—the end of the inhalation (480) or the timer reaching the second predefined threshold (470). If the former occurs first, the duration of the further inhalation is within the second predefined threshold. In this case, processing terminates with no further action, apart from updating the cumulative usage (430), and the processing for the next inhalation will commence again at the start of the flowchart of FIG. 4.

However, if the timer reaches the second predefined threshold prior to the end of the inhalation, then this is regarded as a further indication of abuse, since there have now been two successive inhalations which exceed their respective thresholds. In this situation, the CPU returns the device to sleep mode (475). It will be appreciated that in this situation, further operation of the device is prevented until the device has been returned to user mode by disengaging the vaporizer 40 from the body 20 and then re-engaging the vaporizer with the body.

The processing of FIG. 4 helps to protect against potential abuse of the device in accordance with a two-tier approach, in that there is one sanction against an excessive duration for a single inhalation (an enforced period of inactivity corresponding to the second, predefined interval before the device can be used again), and a further sanction if the first inhalation of excessive duration is then followed directly by a second inhalation of excessive duration (namely, an enforced requirement to separate and re-join the vaporizer and the body before the device can be used again).

In some embodiments, the operations of FIG. 4 not only may help to prevent potential abuse of the device, but they also may help to protect against over-heating by generally limiting the period for which the CPU 50 provides continuous power to the heater to no more than the first predefined threshold. Such over-heating might otherwise potentially occur, for example, if the device failed to detect the end of an inhalation by a user, or if the device was placed in an environment that somehow simulated a prolonged inhalation.

Figure 5A:
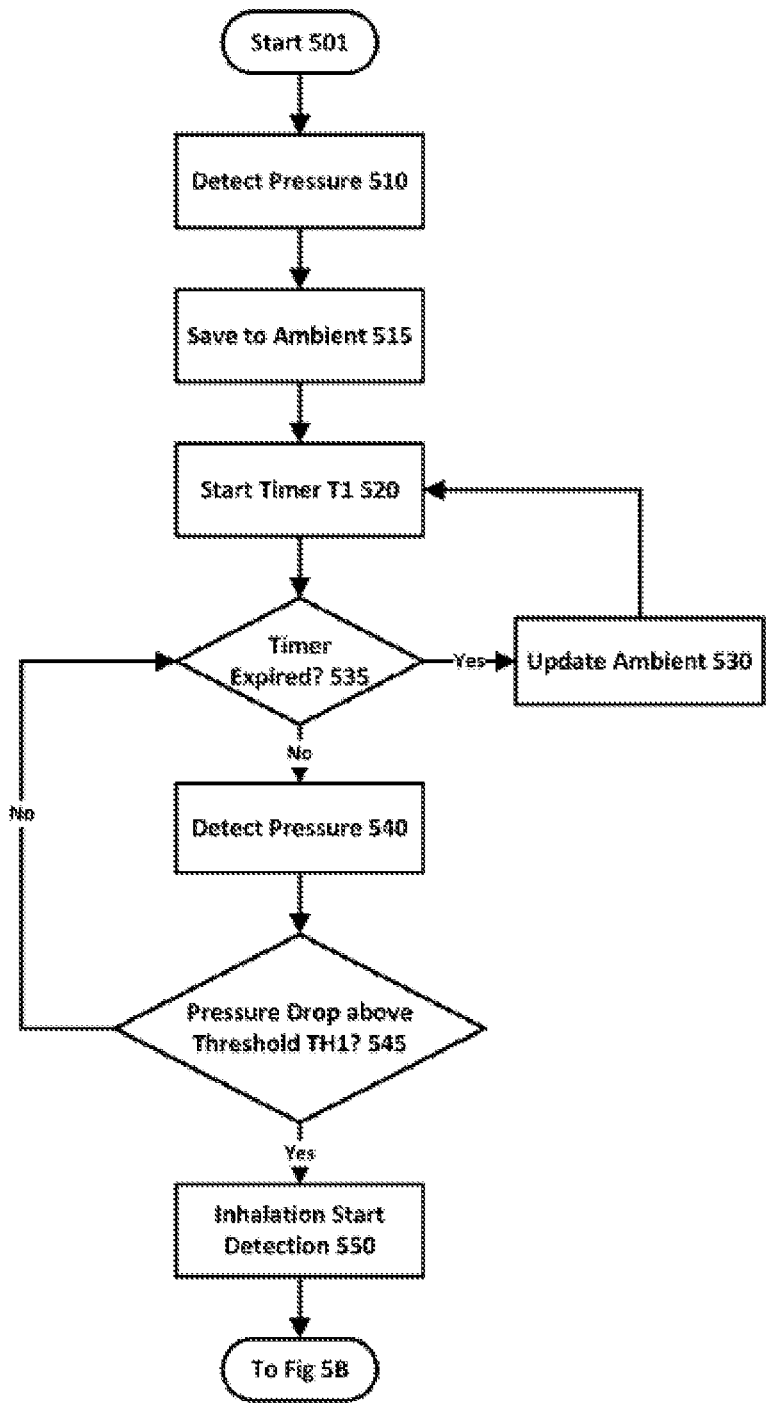
FIGS. 5A and 5B are a flowchart illustrating a method detecting the start and end of inhalation in the device of FIGS. 1 and 2 in accordance with some embodiments of the disclosure.
Figure 5B:
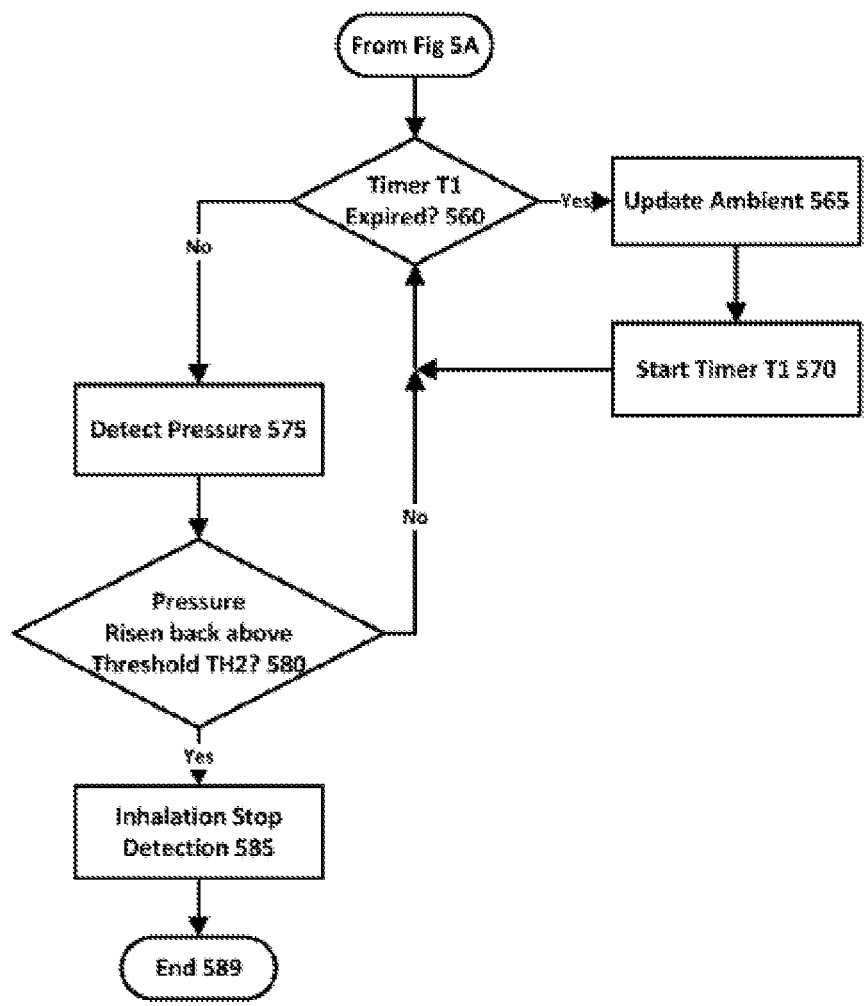

FIGS. 5A and 5B are a flowchart illustrating a method for the device of FIGS. 1 and 2 to detect the start and end of an inhalation in accordance with some embodiments of the disclosure. This method is initiated (501) when the device enters into user mode. The CPU obtains a pressure reading (510) from the pressure sensor multiple (e.g. 5, 8, 9, 10 or 12) times per second. In some implementations, the pressure sensor and the temperature sensor are provided in a single combined unit (integrated circuit device)—this allows the pressure sensor to adjust the pressure reading to a constant temperature value, thereby removing (at least reducing) pressure variations caused by fluctuations in temperature in the pressure readings supplied to the CPU. In other implementations, the pressure and temperature readings may be provided separately to the CPU, which performs its own adjustment or correction of the pressure readings to accommodate any changes in temperature. Other implementations might not have a temperature sensor, in which case the pressure readings would be used directly, without compensation for any variation in temperature.

After the first pressure reading has been acquired, this is saved as an ambient pressure value (515). The CPU also starts a timer T1 (520) which expires after a predetermined time period, say 2, 3 or 4 seconds. The CPU now waits for one of two events. The first event is expiry of the timer (535). In this case, the CPU updates the ambient pressure value (530) to match the most recent pressure reading, resets the timer (520), and repeats the process. Accordingly, absent any other activity, the CPU updates the ambient pressure on a regular basis corresponding to said predetermined time period of the timer T1. In addition, the CPU also compares each newly detected pressure reading (which continue to be obtained (540)) with the current value stored for the ambient pressure (545). If the new pressure reading is below the stored value for the ambient pressure by more than a first predefined amount (threshold TH1), this triggers the second event, namely detection of the start of inhalation (550). Note that the first predefined amount (threshold TH1) may be specified as an absolute or relative difference with respect to the ambient pressure. For example, depending on the particular device, the first predefined amount might be a drop in pressure of (one of) 200, 300 of 400 Pascals, or a percentage drop of 0.2%, 0.3% or 0.4% compared with the (stored) ambient value.

In one implementation, whenever the ambient pressure value is updated at operation 530, the system determines a first trigger pressure value based on the ambient pressure value minus the first predefined amount (threshold TH1). The test at operation 545 to detect the start of inhalation can then check whether the pressure detected at operation 540 is below this first trigger pressure value. If so, the detected pressure represents a drop in pressure greater than the threshold TH1, thereby leading to a positive outcome from operation 545, corresponding to the start of inhalation. One advantage of this approach is that a direct comparison between the detected pressure and the first trigger pressure can be performed quickly and easily to detect the start of inhalation. Other implementations may adopt a different approach to perform this detection, although the end result is the same. For example, each detected pressure might first be subtracted from the current ambient pressure, and the onset of inhalation would then be detected if the result of this subtraction is greater than the threshold T1.

Assuming that the drop in pressure from the current ambient value exceeds the first predefined amount (TH1) at operation 545, the CPU determines that inhalation has commenced. The CPU then supplies power to the vaporizer to vaporize nicotine from the wick into the airflow caused by the inhalation. In addition, the CPU increases the rate at which a pressure sensor reading is obtained (575), say to 20-30 times per second, and sets one or more timers to perform the monitoring described above (see FIG. 4) to track both the duration of this particular inhalation, and also to update the cumulate level of usage over the specified window (Tw). The CPU also continues to update the ambient pressure value 565 whenever the timer T1 expires, and to reset this timer as appropriate (570).

The CPU determines that inhalation has terminated (580) when the pressure sensor reading returns to within a second predefined amount (threshold TH2) from the currently stored ambient pressure value. Similar to the first predefined amount (TH1), the second predefined amount (TH2) may be specified as an absolute or relative difference with respect to the ambient pressure. For example, depending on the particular device, the second predefined amount might be a drop in pressure of (one of) 80, 100 or 120 Pascals, or a percentage drop of 0.08%, 0.1% or 0.12%. Similar to the first predefined amount (TH1), in some implementations, whenever the ambient pressure value is updated at operation 530, the system may determine a second trigger pressure value based on the ambient pressure value minus the second predefined amount (threshold TH2). The test at operation 580 to detect the start of inhalation can then check whether the pressure detected at operation 575 has now risen to be greater than this second trigger pressure value. If so, the detected pressure represents a drop in pressure which is now less than the threshold TH2, thereby leading to a positive outcome from operation 580, representing the end of inhalation. Once the termination of inhalation has been determined (585), the CPU can switch off power to the heater, and reset any timers used in the monitoring processes described above.

Having two separate thresholds (TH1, TH2) for determining (i) the start of inhalation, and (ii) the end of inhalation provides greater flexibility and reliability than just having a single threshold for determining whether or not inhalation is currently in progress. In particular, the threshold for detecting the start of inhalation can be raised somewhat (corresponding to a greater pressure drop from ambient). This helps to provide improved robustness in the detection of inhalation (as opposed, for example, to undesired triggering with respect to changes in environmental conditions, which would then lead to unnecessary heating, and hence consumption of power from the cell and nicotine from the reservoir). Similarly, having a lower threshold for detecting the end of inhalation (a smaller pressure drop from ambient) helps to provide a better measurement of the actual length of inhalation, which is useful for monitoring against potential abuse of the device as described above. For example, it has been found that the latter part of a draw (inhalation) tends to produce a lower pressure drop from ambient, hence if the second threshold (TH2) were not reduced compared with the first threshold (TH1) (corresponding to a lesser pressure drop from ambient), the device would tend to determine that inhalation had terminated while the user was, in fact, still drawing on the device, albeit at a lower level to create a smaller pressure drop.

As illustrated in FIG. 2, the e-cigarette 10 of FIGS. 1 and 2 is powered by a re-chargeable cell 54. In practice, the voltage output of such cells tends to decline as they discharge, for example, from about 4.2V when fully charged, down to about 3.6V just before being fully discharged. Since the power output across a given heating resistor R goes with $V^2/R$, this implies that there would generally be a corresponding drop in power output such that the final operational power output (at a voltage of 3.6V) is only 73% of the initial power output (at a voltage of 4.2V). This change in power supplied by the cell 54 to the heater in the vaporizer 40 may impact the amount of nicotine vaporized (and hence inhaled by a user).

Figure 6:
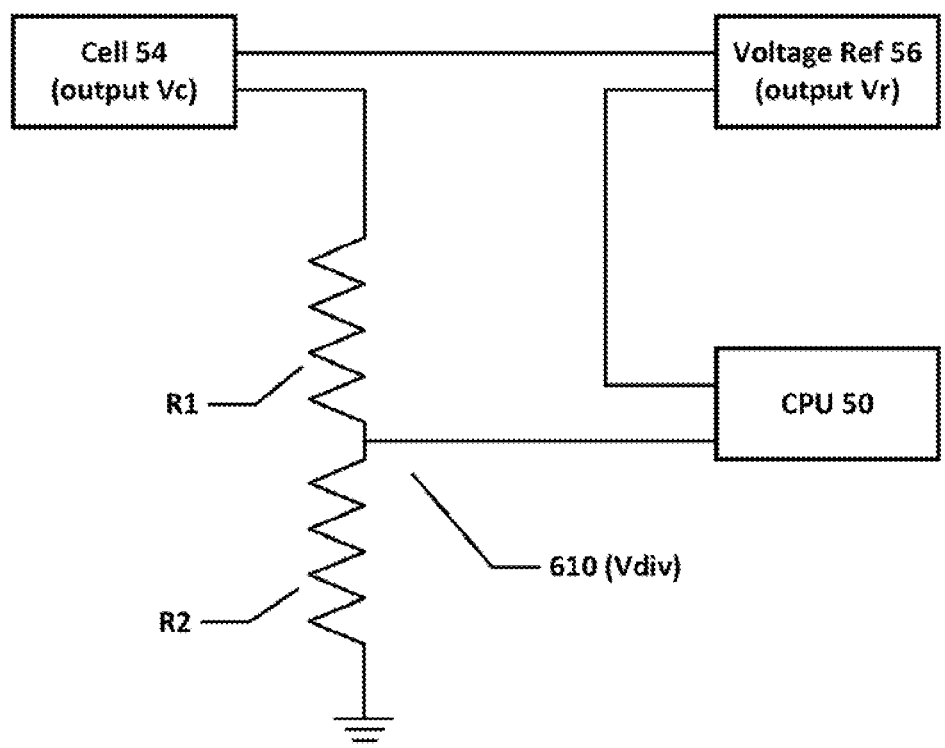
FIG. 6 is a schematic diagram of the power regulation system within the e-cigarette of FIGS. 1 and 2 in accordance with some embodiments of the disclosure.

FIG. 6 is a schematic depiction of a part of the power regulation system for the e-cigarette of FIGS. 1 and 2 in accordance with some embodiments of the disclosure. The power regulation system includes a voltage reference device 56, which provides a consistent (known) output voltage level (Vr), irrespective of variations in the output voltage (Vc) of the re-chargeable cell 54. The power regulation system further comprises a voltage divider comprising two resistors, R1, R2, which receives and divides the output voltage (Vc) in known fashion in accordance with the relative size (resistance) of resistors R1 and R2. The midpoint of the voltage divider 610 is used to take an output voltage (Vdiv).

The CPU 50 receives the voltage Vdiv from the voltage divider and the reference voltage (Vr) from the voltage reference device 56. The CPU compares these two voltages and based on Vr is able to determine Vdiv. Furthermore, assuming that the (relative) resistances of R1 and R2 are known, the CPU is further able to determine the cell output voltage (Vc) from Vdiv. This therefore allows the CPU to measure (track) the variation in voltage output (Vc) from the cell 54 as the cell discharges.

FIG. 7 illustrates how in some embodiments of the disclosure, the power regulation system of the e-cigarette 10 uses a form of pulse-width modulation to compensate for the variation in voltage. Thus rather than the CPU 50 providing continuous electrical power to the heater in the vaporizer 40, the electrical power is supplied instead as a series of pulses at regular intervals, in effect, as a rectangular or square wave. Assuming that each pulse has an "on" duration of Dp, and a pulse is supplied every period of Di (referred to as the pulse interval or interval duration), then the ratio of the pulse duration to the interval duration, Dp/Di, is known as the duty cycle. If Dp=Di then the duty cycle is one (or 100%), and the CPU in effect provides a continuous voltage. However, if the duty cycle is less than 1, the CPU alternates periods of providing electrical power with periods of not providing electrical power. For example, if the duty cycle is 65%, then each voltage pulse has a duration representing 65% of the interval duration, and no voltage (or power) is supplied for the remaining 35% of the interval.

If we consider a signal level which provides power P for a duty cycle of 1 (i.e. continuous supply), then the average amount of power provided when the duty cycle is reduced below 1 is given by P multiplied by the duty cycle. Accordingly, if the duty cycle is 65% (for example), then the effective power rate becomes 65% of P.

Figure 7A:
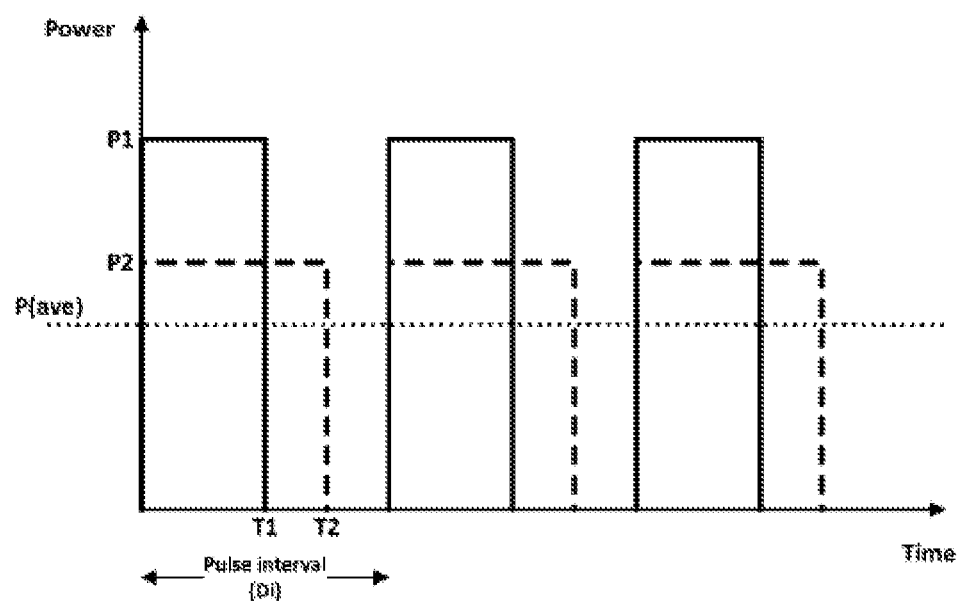
FIG. 7A illustrates how the power regulation system of FIG. 6 changes the duty cycle to maintain a constant average power level in accordance with some embodiments of the disclosure.

FIG. 7A illustrates two different rectangular waves, one shown in solid line, the other shown in dashed line. The pulse interval or period (Di) is the same for both waves. The output shown in solid line has a pulse duration (width) of T1 and a power output when on, i.e. an instantaneous power level, of P1. The duty cycle of this solid line output is T1/Di, to give an average power output of P1×T1/Di. Likewise, the output shown in dashed line has a pulse duration (width) of T2 and an instantaneous power output when on of P2. The duty cycle of this solid line output is T2/Di, to give an average power output of P2×T1/Di.

FIG. 7A also indicates in dotted line the average power output (P(ave)), which is the same for both outputs (solid and dashed line). This implies that (P1×T1/Di)=(P2×T1/Di). In other words, assuming that the pulse interval (Di) is maintained constant, then the average power output is constant provided that the pulse duration (T) varies inversely with the (instantaneous) power output (P), so that P×T is also a constant.

In accordance with some embodiments of the disclosure, the power regulation system of the e-cigarette 10 implements a pulse-width modulation scheme such as shown in FIG. 7A to provide the vaporizer heater with an approximately constant power level. Thus the power regulation system of FIG. 6 allows the CPU 50 to track the current voltage output level from the cell 54. Based on this measured voltage output level, the CPU then sets an appropriate duty cycle for controlling power to the vaporizer heater to compensate for variations in the voltage output level from the cell 54, thereby providing the vaporizer heater with an approximately constant (average) power level. Note that the pulse interval is chosen to be sufficiently short (typically <<1 second) such that it is much smaller than the thermal response time of the heater. In other words, the "off" portions of each pulse are short enough that the heater does not cool significantly during this period. Therefore, the heater provides in effect a constant heat source for vaporizing the nicotine, based on the average received power level, with no significant modulation in heat output at the timescale of individual pulse intervals.

Figure 7B:
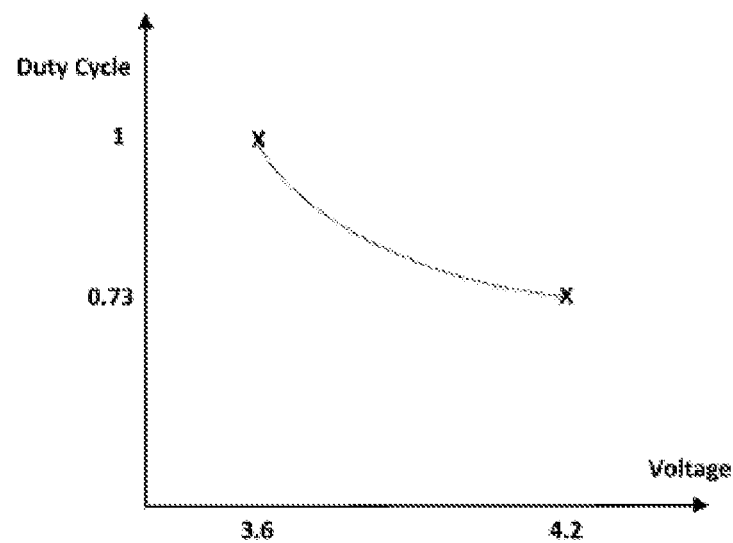
FIG. 7B is a schematic graph showing the variation of duty cycle in relation to the measured or tracked voltage of the cell in accordance with some embodiments of the disclosure.

FIG. 7B illustrates in schematic form the mapping from the (measured) voltage output level to duty cycle. When the cell 54 provides its lowest output voltage (3.6V), the duty cycle is set to 1 (the maximum possible value). When the cell 54 provides its highest output voltage (4.2V), the duty cycle is set to −0.73. FIG. 7B also illustrates schematically the duty cycle for intervening voltages, such that the duty cycle (equivalent to pulse duration for a fixed pulse interval) varies inversely with power output (which is proportional to $V^2$ for a fixed heater resistance). It will be appreciated that the precise variation of duty cycle with voltage shown in FIG. 7B is by way of example only, and may vary according to the details of any given implementation.

As a consequence of the pulse-width modulation scheme described above, the CPU 50 is able to maintain the average power output supplied from cell 54 to the vaporizer heater at an approximately constant level, despite variations in the output voltage level from cell 54. This helps to provide a more consistent heating effect, and hence a more consistent level of nicotine vaporization and therefore inhalation for a user.

Although the e-cigarette described herein comprises three detachable sections, namely the body, cartridge and vaporizer, it will be appreciated that other e-cigarettes may comprise a different number of sections. For example, some e-cigarettes are supplied as a single (unitary) complete device, and cannot be separated at all into different sections, while other e-cigarettes may comprise two sections, in effect, combining the vaporizer described herein with a liquid reservoir, forming a cartomizer. In addition, the e-cigarette described herein comprises multiple features, such as pulse-width modulation for providing a more consistent power level, threshold setting for reliable monitoring of inhalation duration, monitoring cumulative inhalation and/or checking against successive inhalations of excessive length to help protect against abuse, and reverting to sleep mode after a period of inactivity to help protect the device. However, it will be appreciated that some electronic vapor provision system may only have some (or one) of these features, which may be provided in any combination as desired.

In order to address various issues and advance the art, this disclosure shows by way of illustration various embodiments in which the subject matter of the claims may be practiced. The advantages and features of the disclosure are of a representative sample of embodiments only, and are not exhaustive and/or exclusive. They are presented only to assist in understanding and to teach that which is claimed. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein. The disclosure may include other inventions not presently claimed, but which may be claimed in future.

The invention claimed is:

1. An electronic vapor provision system including:
   a vaporizer for vaporizing liquid for inhalation by a user of the electronic vapor provision system;
   a power supply comprising a cell or battery for supplying power to the vaporizer; and
   a power regulation system for compensating for variation in a voltage level of the power supplied to the vaporizer by the power supply using pulse-width modulation, wherein the power regulation system is configured to set a duty cycle for controlling power to the vaporizer based on a measured voltage output level from the power supply, thereby providing a more consistent output level of vaporized liquid for inhalation by the user.

2. The electronic vapor provision system of claim 1, wherein the electronic vapor provision system is configured to measure a current voltage output level from the power supply to set the duty cycle of the pulse-width modulation.

3. The electronic vapor provision system of claim 1, wherein the power regulation system is able to provide an approximately constant power level to the vaporizer.

4. The electronic vapor provision system of claim 1, wherein the vaporizer comprises a heater, and wherein a pulse interval of the pulse-width modulation is set to be smaller than a thermal response time of the heater.

5. The electronic vapor provision system of claim 1, wherein the vaporizer comprises a heater, and wherein the heater is controlled to provide an approximately constant heat source for vaporizing liquid for inhalation by a user.

6. The electronic vapor provision system of claim 1, wherein the power regulation system comprises a voltage reference generator, and the voltage level of the power supplied to the vaporizer is determined based on a comparison with a voltage from the voltage reference generator.

7. The electronic vapor provision system of claim 6, wherein the power regulation system comprises a voltage divider for dividing a voltage from the power supply prior to the comparison with the voltage from the voltage reference generator.

8. The electronic vapor provision system of claim 7, wherein the voltage divider comprises a pair of resistors in series.

9. The electronic vapor provision system of claim 8, wherein the resistors are matched so that a ratio of a resistance of the pair of resistors is relatively stable with temperature.

10. The electronic vapor provision system of claim 1, wherein the pulse-width modulation has a duty cycle of one when the cell or battery has its lowest operational output voltage level.

11. The electronic vapor provision system of claim 1, wherein the system further includes:
    a pressure drop sensor or an air flow sensor for monitoring inhalation by a user through the electronic vapor provision system; and
    a control unit for detecting a start and an end of inhalation based on readings from the pressure drop sensor or the air flow sensor;
    wherein the control unit is configured to:
        monitor a cumulative period of inhalation (Ti) over a predetermined window (Tw), and
        transfer the electronic vapor provision system to a sleep mode if the cumulative period of inhalation (Ti) exceeds a predetermined threshold (Th).

12. The electronic vapor provision system of claim 1, wherein the system further includes:
    a pressure drop sensor or an air flow sensor for monitoring inhalation by a user through the electronic vapor provision system; and
    a control unit for detecting a start and an end of inhalation based on readings from the pressure drop sensor or the air flow sensor;
    wherein the control unit is configured to:
        detect the start of inhalation when the pressure drop sensor or the air flow sensor reading departs by more than a first threshold from a previous reading, and
        detect the end of inhalation when the pressure drop sensor or the air flow sensor reading departs by less than a second threshold from the previous reading, wherein the first threshold is greater than the second threshold.

13. The electronic vapor provision system of claim 1, wherein the system further includes:
    a control unit for controlling the supply of power from the power supply to the vaporizer, the control unit having a sleep mode in which no power is supplied to the vaporizer and a user mode in which power is available for supply to the vaporizer, whereby the control unit reverts from the user mode to the sleep mode after a predetermined amount of time of inactivity in the user mode or after the vaporizer has been disengaged from the power supply.

14. A method for supplying power to a vaporizer of an electronic vapor provision system, wherein the electronic vapor provision system includes a vaporizer for vaporizing liquid for inhalation by a user of the electronic vapor provision system, and a power supply comprising a cell or battery for supplying power to the vaporizer, the method comprising:
    supplying power to the vaporizer from the power supply using pulse-width modulation; and
    compensating for variation in a voltage level of the power supplied to the vaporizer by the power supply using pulse-width modulation by setting a duty cycle for controlling power to the vaporizer based on a measured voltage output level from the power supply, thereby providing a more consistent output level of vaporized liquid for inhalation by the user.

* * * * *